US012426045B2

(12) United States Patent
Amuru et al.

(10) Patent No.: US 12,426,045 B2
(45) Date of Patent: Sep. 23, 2025

(54) METHOD AND SYSTEM FOR TRANSFERRING DATA BETWEEN DISTRIBUTED UNIT AND RADIO UNIT

(71) Applicants: INDIAN INSTITUTE OF TECHNOLOGY HYDERABAD (IITH), Sangareddy (IN); WISIG NETWORKS PRIVATE LIMITED, Hyderabad (IN)

(72) Inventors: Saidhiraj Amuru, Sangareddy (IN); Arpit Jain, Sangareddy (IN); Nikhil Reddy Allola, Nirmal (IN); Alok Ranjan Kesari, Uttar Pradesh (IN); Kiran Kumar Kuchi, Hyderabad (IN)

(73) Assignees: Indian Institute of Technology Hyderabad (IITH) (IN); Wisig Networks Private Limited (IN)

( * ) Notice: Subject to any disclaimer, the term of this patent is extended or adjusted under 35 U.S.C. 154(b) by 390 days.

(21) Appl. No.: 17/926,808

(22) PCT Filed: May 21, 2021

(86) PCT No.: PCT/IN2021/050497
§ 371 (c)(1),
(2) Date: Nov. 21, 2022

(87) PCT Pub. No.: WO2021/234739
PCT Pub. Date: Nov. 25, 2021

(65) Prior Publication Data
US 2023/0209549 A1    Jun. 29, 2023

(30) Foreign Application Priority Data
May 22, 2020    (IN) ............... 202041021530

(51) Int. Cl.
*H04W 72/20* (2023.01)
*H04W 92/12* (2009.01)
(52) U.S. Cl.
CPC ............ *H04W 72/20* (2023.01); *H04W 92/12* (2013.01)

(58) Field of Classification Search
CPC ..... H04W 72/20; H04W 92/12; H04W 28/02; H04W 72/1268; H04W 72/0446;
(Continued)

(56) References Cited

U.S. PATENT DOCUMENTS

2007/0293231 A1* 12/2007 So ................. H04W 72/23
455/450
2008/0095037 A1* 4/2008 Chang ............ H04L 5/0092
370/204
(Continued)

FOREIGN PATENT DOCUMENTS

WO    2020070652 A1    4/2020
WO    2020081746 A1    4/2020

OTHER PUBLICATIONS

Machine Translation of KR 20210046495 A. foreign priority application for Rhim et. al., US 20210120527 A1 (Year: 2019).*
(Continued)

*Primary Examiner* — Sun Jong Kim
(74) *Attorney, Agent, or Firm* — McAndrews, Held & Malloy, Ltd.

(57) ABSTRACT

A base station (BS) and a method of operating the BS. The BS comprises a distributed unit (DU) and a radio unit (RU). The DU is configured to transmit control information to the RU using a control message. The DU is configured to transmit u-plane data to the RU using a u-plane message. The RU is configured to receive the u-plane message according to a semi persistent technique or a periodic technique. The control message comprises a c-plane message or an m-plane message. The control message comprises an indication to use the semi persistent technique or the periodic technique to receive the u-plane message. The indication is valid to be used by the RU to receive the u-plane message carrying the u-plane data and at least one u-plane message subsequently received by the RU, for a predetermined time period as indicated by the control message.

10 Claims, 8 Drawing Sheets

(58) Field of Classification Search
CPC ... H04L 5/0048; H04L 5/0044; H04L 5/0053; H04L 5/0094
See application file for complete search history.

(56) References Cited

U.S. PATENT DOCUMENTS

| | | | | |
|---|---|---|---|---|
| 2016/0373901 | A1* | 12/2016 | Urabayashi | H04W 76/28 |
| 2018/0042043 | A1* | 2/2018 | Babaei | H04W 76/38 |
| 2019/0253197 | A1* | 8/2019 | Babaei | H04L 1/188 |
| 2019/0349145 | A1* | 11/2019 | You | H04W 16/14 |
| 2020/0092908 | A1* | 3/2020 | Li | H04L 5/0078 |
| 2020/0196343 | A1* | 6/2020 | Marinier | H04W 72/23 |
| 2021/0120527 | A1* | 4/2021 | Rhim | H04L 27/2602 |
| 2021/0204297 | A1* | 7/2021 | Wu | H04L 1/1887 |
| 2022/0052806 | A1* | 2/2022 | Österling | H04L 5/0048 |
| 2022/0338032 | A1* | 10/2022 | Hu | H04W 24/04 |

OTHER PUBLICATIONS

Int'l Search Report and Written Opinion Appln No. PCT/IN2021/050497 mailed Aug. 13, 2021.

* cited by examiner

| eCPRI Version = 0001 | eCPRI Reserved = 000 | Concat |
|---|---|---|
| eCPRI Message Type = 8'b2 for Control ||||
| eCPRI Payload Size ||||
| eCPRI Pcid/Rtcid ||||
| eCPRI Seqid ||||
| data dir | Payload Version = 001 | filter Index ||
| Frame ID ||||
| Sub Frame ID || Slot ID ||
| Slot ID | Start Symbol ID |||
| Number Of Sections ||||
| Section Type ||||
| ud Comp Header = 0 ||||
| Reserved ||||
| Section ID ||||
| Section ID | rb = 0 | symInc | Start PRBc |
| Start PRBc ||||
| num PRBc ||||
| Parameter1 || Parameter2 ||
| reMask[11:4] ||||
| reMask[3:0] || numSymbol ||
| ef = 0 | beamId[14:8] |||
| beamId[7:0] ||||
| Section Extensions as indicated by ef ||||
| Section ID ||||
| Section ID | rb = 0 | symInc | Start PRBc |
| Start PRBc ||||
| num PRBc ||||
| reMask[11:4] ||||
| reMask[3:0] || numSymbol ||
| ef = 0 | beamId[14:8] |||
| beamId[7:0] ||||
| Section Extensions as indicated by ef ||||
| Section ID ||||
| Section ID | rb = 0 | symInc | Start PRBc |
| Start PRBc ||||
| num PRBc ||||
| reMask[11:4] ||||
| reMask[3:0] || numSymbol ||
| ef = 0 | beamId[14:8] |||
| beamId[7:0] ||||
| Section Extensions as indicated by ef ||||

Figure 10

METHOD AND SYSTEM FOR TRANSFERRING DATA BETWEEN DISTRIBUTED UNIT AND RADIO UNIT

CROSS-REFERENCE TO RELATED APPLICATIONS

This application is a national stage application under 35 U.S.C. § 371 of application Serial No. PCT/IN2021/050497, filed on May 21, 2021, and entitled "METHOD AND SYSTEM FOR TRANSFERRING DATA BETWEEN DISTRIBUTED UNIT AND RADIO UNIT" which claims priority from the Indian Provisional Patent Application No. 202041021530, filed on May 22, 2020, the entirety of which are hereby incorporated by reference. The aforementioned application is hereby incorporated herein by reference in its entirety.

TECHNICAL FIELD

Embodiments of the present disclosure are related, in general to communication, but exclusively relate to a method for data transfer between a distributed unit (DU) and a radio unit (RU) in a base station.

BACKGROUND

Conventional radio access networks (RAN) were built using an integrated unit, in which the entire RAN was handled. The RAN conventionally uses application specific hardware for processing, making them difficult to upgrade and evolve. As the networks evolve to support massive densification of networks, which are intended to support increased capacity requirements, there is a growing need to reduce the capital and operating costs related to the deployment of RAN and obtain scalable and easy to upgrade solutions.

Cloud based Radio Access Networks (CRAN) are networks in which a significant portion of the RAN layer processing is performed at a central unit (CU). The CU is also referred as baseband unit (BBU), which is located in the cloud on commercial off the shelf servers, while RF and real-time critical functions can be processed in the remote radio unit (RRU also referred as RU) and a distributed unit (DU). Occasionally, the DU is also considered to be part of the CU depending on the functional split.

In order to communicate, the RU and DU/CU require an interface which is known as the front haul. However, there are several challenges that go into the interface design, as splitting of the RAN functions into the CU and DU which can impact the transport latency and bandwidth requirements. Also, there are many different features in RAN that need to be supported. The choice of the split and the communication interface aspects need a careful designed.

Traditional RANs implement the physical layer (PHY) and the protocol stack (e.g. Medium Access Control (MAC), Radio Link Control (RLC), Packet Data Convergence Control (PDCP layers)) at a base station (BS). The BS is also referred to as eNodeB or eNB). In Cloud RAN, different radio functions are split between the remote radio unit (RU) and the baseband unit (BBU). The RUs are implemented locally onsite, while the BBU is virtualized on the cloud, which could be few hundreds of miles or kms away from the RU. A single BBU also referred as vRAN-virtualized RAN, which is a specific form of CRAN running on a COTS hardware platform in a VM, can control multiples of RUs in different locations.

In LTE networks, all the LTE functionalities and the layers of the LTE protocol stack exist in in the eNB small cell, which may be deployed on site. There are multiple benefits of the CRAN solution i.e., splitting the BBU and the RRU, compared to traditional LTE networks. The same benefits apply to 5G NR networks as well.

The Cloud RAN facilitates centralization and virtualization of RAN networks, leading to benefits such as operation cost reduction due to resource pooling and running the network on general-purpose hardware, enabling economies of scale; performance improvements due to better interference management; remote upgradeability and management of the network; and simpler migration to add new features and transition from one network to another i.e. for example 4G to 5G networks. Also, the CRAN provides flexibility to the Mobile network operators (MNO) to be able to optimize system performance in real-time by varying various configuration and system parameters using the cloud-based infrastructure.

FIG. 1 shows a traditional Radio Access Networks (RAN) architecture, typically deployed as a co-located architecture. As shown in FIG. 1, the RAN architecture includes Base station (BS), backhaul and core. The BS comprises remote radio head (RRH)/radio unit (RU) and base band unit (BBU). The RU comprises amplifiers, filters and an analog frontend components of a transceiver, and the BBU with the baseband modem were typically co-located either at the top or bottom of the cellular tower. When located at the bottom of the tower, RF cables from the antenna feeds at the top of the tower were used to connect to the units at the bottom of the tower. These methods typically had significant losses due to these RF cables and warranted special solutions.

FIG. 2 shows a centralized RAN architecture, wherein common public radio interface (CPRI), a protocol for IQ data transmission is used between the RRH and BBU via optical fiber. This architecture allowed the BBU unit to be located at a distant location from the cell tower in which case the CPRI cables had to be long such as few kilometers (kms) to support a centralized deployment A centralized RAN deployment further evolved to support a cloud-RAN deployment, which allowed the BBU to coordinate radio units across multiple sites, better coordinate interference across multiple sites and improve overall network throughput. The front haul (FH) was supported initially supported by CPRI. However, it was soon realized that CPRI has too much overhead and lot of bandwidth wastage even during idle times. Quickly, this was replaced by eCPRI standard (enhanced CPRI) which supports Ethernet based IP packet flows only when traffic is present, which is not point-to-point like CPRI. This architecture also allowed for the BBUs to be virtualized to be able to support on-demand services.

A cloud-RAN architecture evolved which could support more splits. The BBU itself is split into a real-time distributed unit (DU) and a non-real-time control unit (CU), where a single DU can source multiple RUs and a single CU can source multiple DUs. However, there is not a single place where the split between RU, DU and CU can be done in the entire protocol stack of a wireless network such as 4G and 5G.

Also, in the existing systems possible splits are performed using the various components of a wireless stack. Depending on the splits between the CU-DU and DU-RU, the bandwidth and latency requirements change in the entire design. This problem especially aggravates with the introduction of the massive MIMO solutions to enhance capacity and coverage. Further, there is DU-RU split with 5 potential split points. The bandwidth requirements on the DU-RU interface change from a mere 100 Mbps at split 6 to 250 Gbps at split 8 when multiple antennas, higher order modulations and 100 MHz bandwidth systems are considered. Hence, this requires a careful analysis and design of the entire wireless system.

The split is also commonly referred to as the low-PHY and high-PHY split. The low PHY is the portion closer to the radio and the high PRY is the one closer to the baseband. The low PHY portion is typically referred to as the RU and the high PRY portion as the DU. The high PHY does the baseband processing at bit level including FEC, and modulation mapping. The output of this is passed to a precoder module. The precoding module can be either in low-PHY or the high-PHY depending on the split used. Depending on where the precoding module is present the two nodes i.e., the DU and RU may have to communicate with each other the precoding vectors for the DL MIMO operation. Similarly, in the uplink the beamforming on the received vectors can be performed either in the high PHY or the low-PHY portions. Depending on where the split is and what operations are performed in each block, the DU-RU or the low-PHY and high-PHY blocks exchange information necessary for precoding and beamforming operations via the interface. If the beamforming is done in low-PHY, then the high-PHY must in advance send these beamforming vectors to the low-PHY which can be based on some reference signals. However, the low-PHY itself can design its own beamforming vectors then there is no need for any message exchange. The low-PHY then sends the beamformed received signals to the high PRY for further processing.

Modern designs have baseband and RF units split out in the form of distributed unit (DU) and radio unit (RU). The DU handles the baseband processing part and the RU handles the radio part including antennas, filters, ADCs and DACs. The output of the RUs is fed to the DUs for further processing. The DU and RU communicate with each other and typically the RU acts as a slave to the master DU. The DU may in turn communicate to the CU (central unit) which can house the scheduler in some designs or the DU itself may house the scheduler. The control from DU to RU may be sent via ORAN messages which includes the control plane and user plane messages among others.

Another RAN architecture that supports a vertical split along the various protocol layers and horizontal splits within a protocol layer to support control plane and user plane traffic separation is proposed by the ORAN alliance. This alliance narrowed down to split, between DU-RU and split 2 between CU and DU. To accommodate the split, new interfaces defined as control plane, user plane, synchronization plane and management plane are defined. The CUS Plane is at least one of Control, User and Synchronization Plane which is configured for real-time control-plane communications between the DU and RU, user plane traffic in DL and UL between DU and RU, synchronization of the RU generally sources from the DU, and uses Ethernet transport and eCPRI/IEEE 1914.3 radio application transport.

The Management Plane or M-Plane is configured to for management of the Radio Unit (RU) as governed by the DU, provides all non-real-time control of the RU (Real time control uses the C-Plane) and uses Ethernet (UDP/IP) transport.

Different blocks such as modulation, scrambling, precoding, rate matching and the reverse operations for the uplink are split between the DU and RU as per the split option. Depending on the number of the antennas at the RU side which is connected to the antennas, the DU can send beamforming vectors to the RU. The RU can apply beamforming vectors by itself as well. The DU-RU can exchange their capabilities at the startup. There is a S-plane based synchronization via PTP module on both sides and the grand-master clock to which the nodes synchronize. Based on the timeline, messages are exchanged. The messages between DU and RU can be compressed and sent to save BW. This is called IQ compression. Then the other node has to decompress before using the information. The messages are exchanged both DL and UL directions. In either case DU is the master and RU will be the slave.

As new wireless technologies and standards appear, MNOs are required to upgrade their eNB small cells which is usually accompanied by high costs. Using CRAN, most of the LTE functionalities in the BBU will be software-based, which can be easily upgraded when new wireless technologies appear. This can reduce upgrading costs significantly.

ORAN is a standards organization that defines the interfaces between CU-DU and DU-RU to support interoperability across different equipment. This is crucial to support CRAN deployments in the cellular technologies such as 4G and 5G.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method of communication in a base station (BS) is disclosed. The BS comprising a distributed unit (DU) and at least one radio unit (RU), said DU performs High-PHY processing and said RU performs low-PHY processing. The method comprises transmitting, by the DU, a control information to the at least one RU using at least one of a c-plane message and a m-plane message, and data using a u-plane message. The u-plane message is transmitted in one of a semi persistent and periodic technique. The transmitting of the at least one of a c-plane message and a m-plane message indicates the u-plane data as one of a semi persistent and a periodic, said transmitting is valid for the u-plane messages carrying the u-plane data for a predetermined time period.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

FIG. 10 shows a sample example of a C-plane message with parameter-1 and parameter-2 embedded in the C-plane message.

Figure 1:
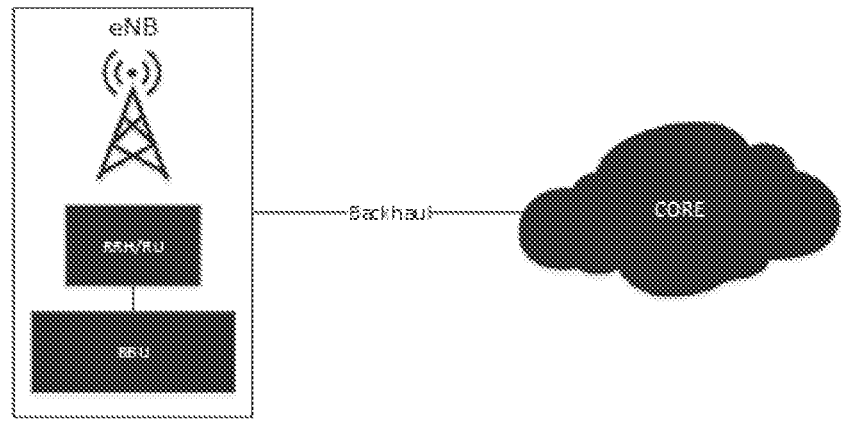
FIG. 1 shows a traditional Radio Access Networks (RAN) architecture.
Figure 2:
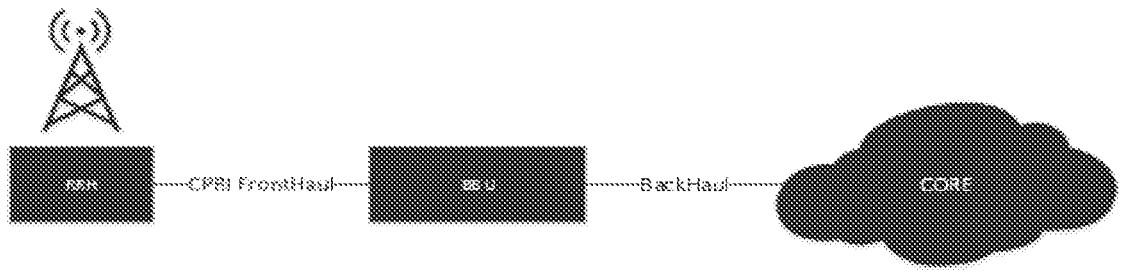
FIG. 2 shows a centralized RAN architecture.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Embodiments of the present disclosure relate to a system and a method to data transfer between a distributed unit and a radio unit. Specifically, the embodiments disclose methods to reduce the front haul signaling bandwidth between the two nodes by exploiting the type of traffic being exchanged between the two nodes.

Figure 3:
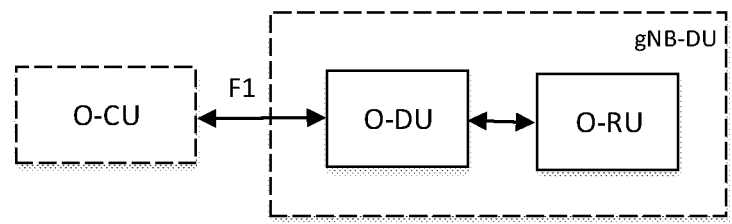
FIG. 3 shows a block diagram of a CRAN system with CU, DU and RU, wherein O-corresponds to ORAN compatible.

FIG. 3 shows a block diagram of a system to perform data transfer without C-plane messages in a communication network, in accordance with some embodiments of the present disclosure.

As shown in FIG. 3, the system also referred as a communication system, or a distributed base station (DBS) or gNB or base station (BS) or O-radio access network BS (ORAN BS), which comprises a controller or a processor, memory, and other blocks (not shown in the FIG. 3). The memory may be communicatively coupled to the processor. The processor may be configured to perform one or more functions of the system to perform data transfer and also control the data transfer. In one implementation, the system may comprise blocks, also referred as units or modules, for performing various operations in accordance with the embodiments of the present disclosure.

The system includes a radio unit (RU), also referred to as ORAN RU or O-RU, distributed unit (DU), also referred to as digital unit or ORAN DU or O-RU and a central unit, also referred to as ORAN CU or O-CU. Also as shown in the FIG. 3, the system includes an interface between the O-DU and O-RU, and between O-CU and O-DU. The interface between O-CU and O-DU is referred to as F1 interface. A O-DU$_x$ is a specific O-RAN Distributed Unit (O-DU) having fronthaul split option x where x may be 6, 7-2 (as defined by ORAN standards) or 8. A O-RU$_x$ is a specific O-RAN Radio Unit having fronthaul split option x, where x is 6, 7-2 (as defined by ORAN standards) or 8, and which is used in a configuration where the fronthaul interface is the same at the O-DU$_x$ In an embodiment, the BS comprising a distributed unit (DU) and at least one radio unit (RU), said DU performs High-PHY processing and said RU performs low-PHY processing. The BS is configured to perform a method of communication or data transfer between the DU and at least one RU. The method comprises transmitting, by the DU, a control information to the at least one RU using at least one of a c-plane message and a m-plane message, and data using a u-plane message. The u-plane message is transmitted in one of a semi persistent and periodic technique. The transmitting of the at least one of a c-plane message and a m-plane message indicates the u-plane data as one of a semi persistent and a periodic, said transmitting is valid for the u-plane messages carrying the u-plane data for a predetermined time period.

The DU contains all the baseband signal processing capabilities such as, but not limited to channel encoding, decoding, scrambling, modulation, reference signal generation, channel estimation etc. among others. The main functionalities of the RU include performing fast Fourier transform (FFT) or discrete Fourier transform (DFT), inverse FFT (IFFT) or inverse DFT (IDFT), cyclic prefix (CP) addition, CP removal, physical random access channel (PRACH) reception, PRACH front end filtering. In an embodiment, the DU is configured as the master and controls the RU by sending a C-plane message. The DU performs at least one of resource block mapping information, slot number, symbol number, etc. The actual data is sent via the U-plane messages which has the actual IQ data to be sent per symbol, per slot, per subframe etc. The sent data can be compressed or de-compressed to save front haul bandwidth. The DU-RU can also communicate via the S-plane messages to synchronize their timing and manage the delays for various messages. There is another set of messages called as M-plane to understand the capabilities of each device and also to communicate some changes in settings, such as temperature, health monitoring among others.

In an embodiment, the method of communication is performed by transmitting or sending U-plane messages preceded by the C-plane messages. The DU transmits C-plane messages to perform at least one of transmitting data to the RU and receiving data from the RU. The control information for each U-plane message is based only on the C-plane message preceding it. The RU may use the control data from the C-plane to interpret the incoming U-plane data or messages before transmission on RF via over the air or to send the incoming RF data to send to DU. This procedure involves regular C-plane messages to be sent for every U-plane messages. The u-plane data comprises at least one of uplink data and downlink data. The uplink data is one of physical random access channel (PRACH), sounding reference signal (SRS), physical uplink shared channel (PUSCH), physical uplink control channel (PUCCH) data, and reference signals (RS). The downlink data is one of synchronization signal block (SSB), physical downlink control channels (PDCCH), physical downlink shared channels (PDSCH), and reference signals (RS).

Figure 4A:
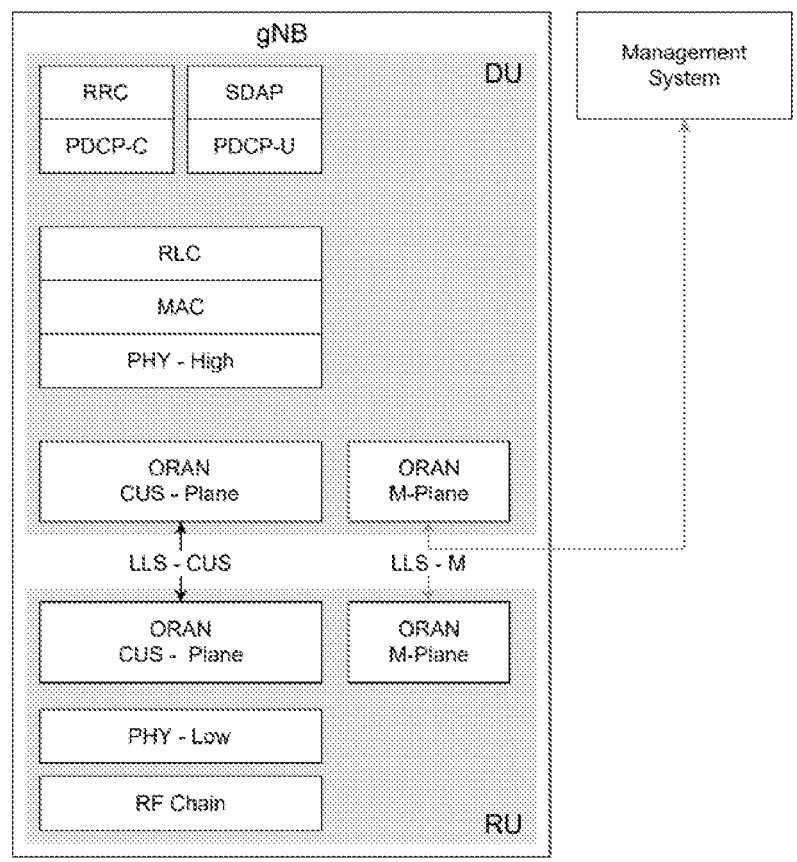
FIG. 4A shows schematic representation of the front haul interface in the system of FIG. 3, in accordance with an embodiment of the present disclosure.

In an embodiment, a message between the DU and the RU indicates a C-plane message may be sent for semi-persistent scheduling type U-plane messages to reduce C-plane payload on the front-haul as shown in FIG. 4A. A semi-persistent scheduling or technique is one where the same kind of control information is valid for a long time or predetermined time period and can be exploited to reduce front haul bandwidth. The RU transmits an indication to the DU, said indication is about handling at least one of the semi persistent and periodic scheduling or technique.

FIG. 4A shows schematic representation of the front haul interface in the system of FIG. 3, in accordance with an embodiment of the present disclosure. As shown in the FIG. 4A, the traffic is classified into two types based on the associated timing i.e. Real time and Non-Real time, i.e. the two types are control-user and synchronization (CUS-plane); and management-plane (M-Plane). The CUS plane is also referred as control plane, user plane and synchronization plane. The control information provides at least one of resource block (RB) mapping information, beamforming (BF) scheduling information, BF channel information. The synchronization messages are used for synchronizing the DU and the RU timings. The DU transmits a message with a timestamp to the RU, and the RU synchronizes with DU considering all the processing delays and transport variation. This is used as frame and sub frame boundary.

The CUS Plane covers real-time control-plane communications between the DU and RU, user plane traffic in one of downlink (DL) and uplink (UL) between the DU and the RU. Also, the CUS plane covers synchronization of the RU sources from the DU. The CUS plane uses at least one of Ethernet transport and eCPRI/IEEE 1914.3 radio application transport.

In an embodiment, the example of C-plane messages is eCPRI message type-2 maps to C-plane message in the ORAN, data sections which identify which symbols or portions of symbols i.e. physical resource blocks (PRBs) are addressed, control information can allow empty-data PRBs allowing the RU to blank transmissions for energy-savings, and carrying enhanced common public radio interface (eCPRI) headers to allow the eCPRI protocol based communication.

The U-plane specification is at least one of the U-Plane is used to send actual IQ data as arranged in spatial streams or layers, already mapped into the resource elements; data transported in compressed format if compression is enabled; data transmitted symbol by symbol as U-Plane messages; there is no sectionType, reMask or numberOfsections parameter for U-Plane messages; and the sectionType and reMask values are inferred from the matching C-Plane Section Id.

The U-Plane Data specification is compression or compressed data. The data rates increase linearly with spatial streams (or layers) in split option 7.2x. Various compression methods are currently supported such as but not limited to No Compression, Block Floating Point, Block Scaling, µ-law compression, Modulation Compression.

The M-Plane covers management of the Radio Unit (RU) as governed by the DU. The M-plane provides all non-real-time control of the RU i.e. real time control uses the C-Plane. The M-plane uses Ethernet (UDP/IP) transport. The payload is encapsulated within the Ethernet payload. The M-plane or management plane uses RU self-identification i.e. the RU informs the type of compression techniques, maximum number of CC or antennas it can support. An example of M plane message that supports the semi-persistent scheduling are at least one of periodic-prach-configurations, periodic-prach-config-id -pattern-period, and pattern-time-validity-period.

In an embodiment, the period, periodicity, time period is all related to the behavior of the physical channel being exchanged between DU and RU. Also, there can be capability exchange messages between DU and RU to indicate whether each node supports this feature or not. The M-plane messages can be associated with section ID among others to make a mapping between M-plane and U-plane messages.

The RU is located at the base station and the DU may be located at a central base station, also referred to as a central tower, where all the processing happens. This is as shown in FIG. 4B.

Figure 4B:
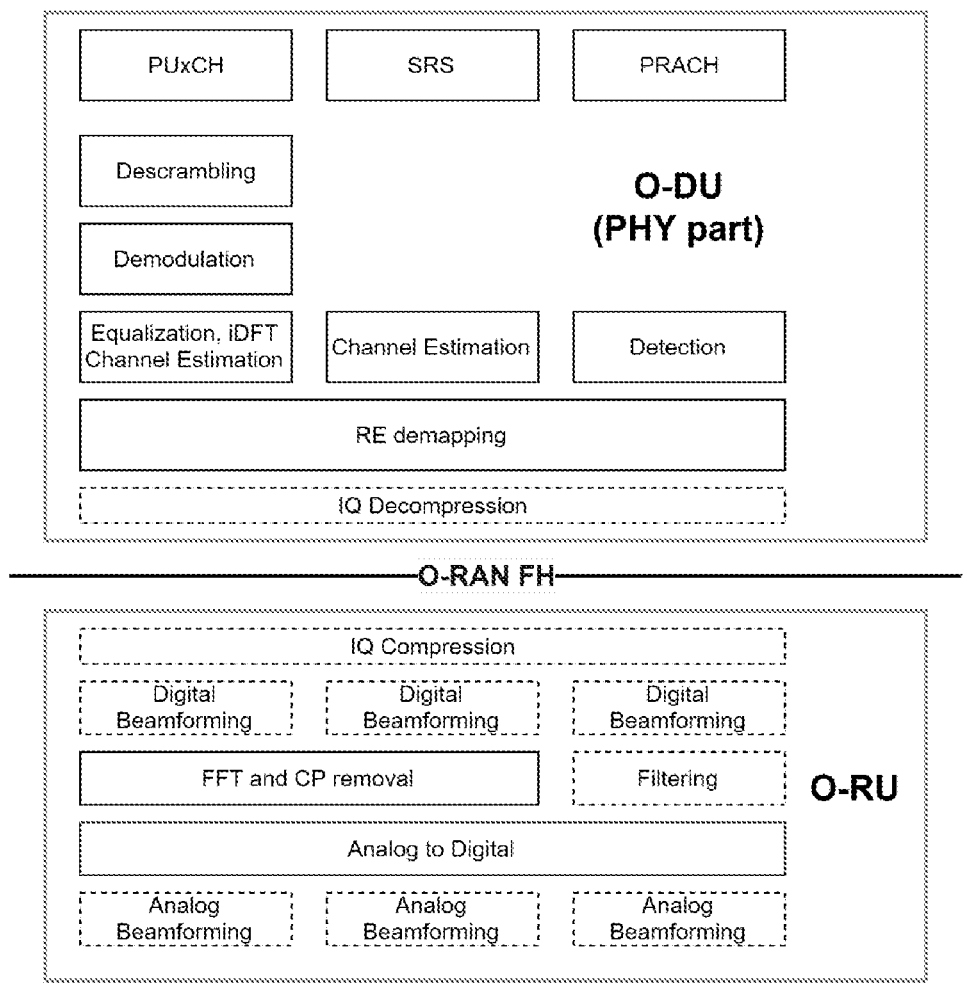
FIG. 4B shows internal functions representation of distributed unit (DU) and radio unit (RU) of the system of FIG. 3, in accordance with an embodiment of the present disclosure.

FIG. 4B shows internal functions representation of distributed unit (DU) and radio unit (RU) of the system of FIG. 3, in accordance with an embodiment of the present disclosure. The DU is also referred as O-DU. The RU is also referred as O-RU. The CUS-Plane is split point 7-2x in UL for NR. Unlike in the DL case, the RU category makes no difference in UL. The RU performs at least one of inverse Fast Fourier Transform (IFFT) or FFT, cyclic prefix (CP)

removal operations and filtering. The remaining PHY functions are performed by the O-DU.

In an embodiment, the system as shown in FIG. 3A may be used for performing operation on at least one of PRACH, sounding reference signals (SRS), semi-persistent PDSCH and PUSCH used in VOLTE or PUCCH when the resources are decided to be fixed by the BS and not to be changed. Instead of sending C-plane messages for these payloads in every slot, DU and RU front-haul payload can be saved.

The following are some of the parameters used by the system as shown in FIG. 3A:

Parameter-1 is a new message in C-plane payload or M-plane payload to indicate periodic occurrence of a U-plane data. Fields such as periodicity (in terms of periodicity in terms of symbols, slots or sub-frames or frames) may be introduced.

Parameter-2 is a message which indicates validity until when the C plane message can be assumed to be used such as 10 ms, or 20 ms or 10 frames or 1 slots or 10 symbols etc.

Parameter-3 is a C-plane ID for this message may be frozen by the DU and not used for another C-plane message in another slot. Or if the same C-plane ID is seen by the RU, it will use the new configuration and forget the old configuration. A precedence can be set for the RU behaviour in case same C-plane ID must be used. Either the RU may be explicitly asked to use a new C-plane configuration or implicitly by the use of a timeout.

Parameter-4 indicates a behaviour which may be activated or de-activated by a new parameter by the DU. The M-plane message may configure the RU to be prepared for such a payload. Then a C-plane message may be sent to activate or de-activate such a behaviour.

Parameter-5 is a RU parameter which may be instructed to use such a configuration only from the beginning of "N"th slot or "N"th frame or after some time duration from when the message is received.

Parameter-6 indicates add RU capability to indicate whether this feature is supported or not to a M-plane message.

Parameter 7 indicates which eAXC id for which this kind of semi-persistent scheduling is applicable.

This can be applicable for scheduling, beamforming, PRACH, SRS, PDSCH, PUSCH, SSB data among others any data which is periodic, semi-persistent.

Figure 5A:
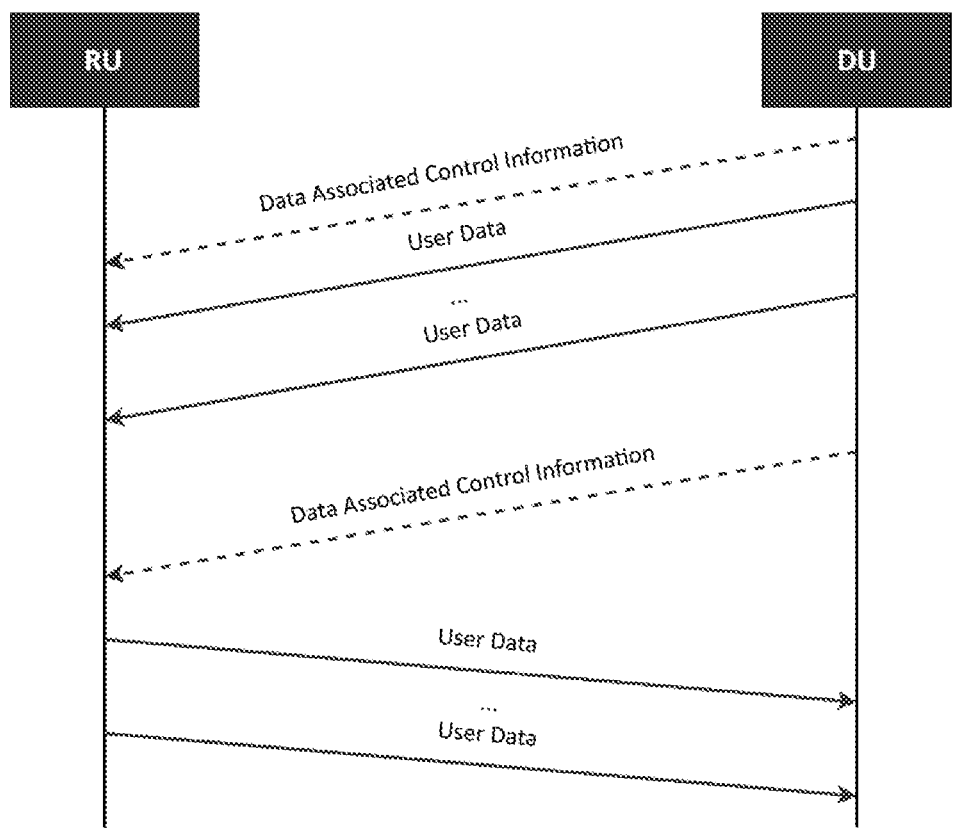
FIG. 5A shows a message timing representation between the DU and the RU, in accordance with an embodiment of the present disclosure.

FIG. 5A shows a message timing representation between the DU and the RU, in accordance with an embodiment of the present disclosure. As shown in FIG. 5A, the DU transmits a first message i.e. C-plane message to the RU. This message may be to indicate a transmission or a for receiving data. Thereafter, the RU sends a U-plane message. This is as shown in the FIG. 5A C/U-Plane timing message. The C-Plane messages precede U-Plane messages, and a single C-Plane message may cover multiple U-Plane messages.

Figure 5B:
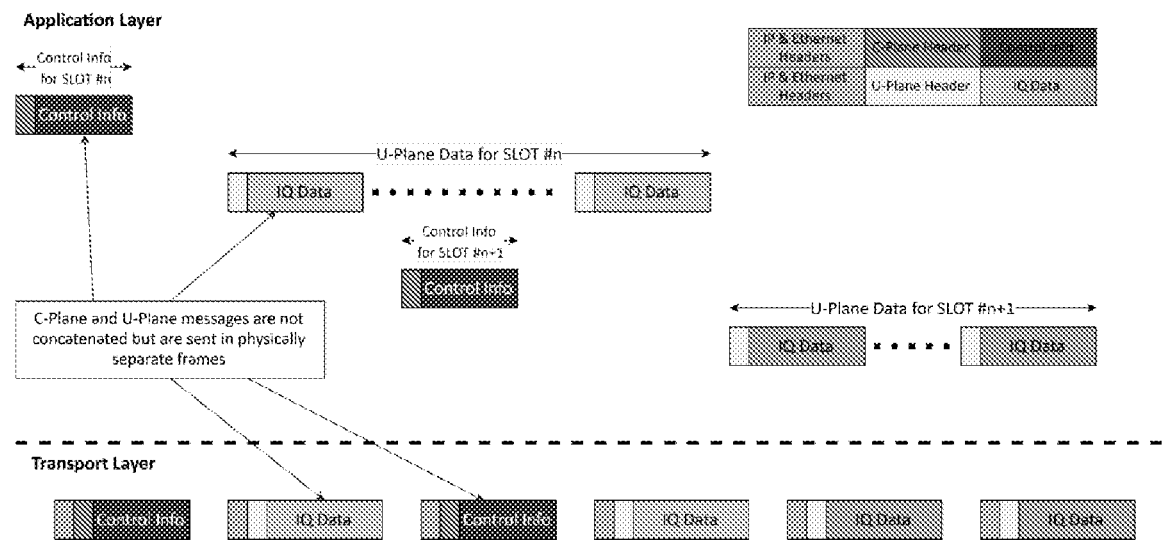
FIG. 5B shows a method of data transmission with the control plane messages in a communication network, in accordance with an embodiment of the present disclosure.

FIG. 5B shows a method of data transmission without the control plane messages in a communication network, in accordance with an embodiment of the present disclosure. The method or the procedure includes on the RU side, such a C-plane message is stored until the end of time as prescribed by parameter-2, and with the periodicity as indicated by parameter-1, the same C-plane configuration will be used. PRACH patterns are defined in 3GPP spec. They have a specific periodicity. If that configuration index is passed to RU and RU also has this knowledge of configuration index (which currently it does not), then it can implicitly use this behaviour rather than explicit indication by the DU to the RU. Same holds for SRS patterns. Can be used for frequency hopping as well. If the same C-plane message can be applied with a frequency offset, then C-plane overhead can be reduced.

Figure 6:
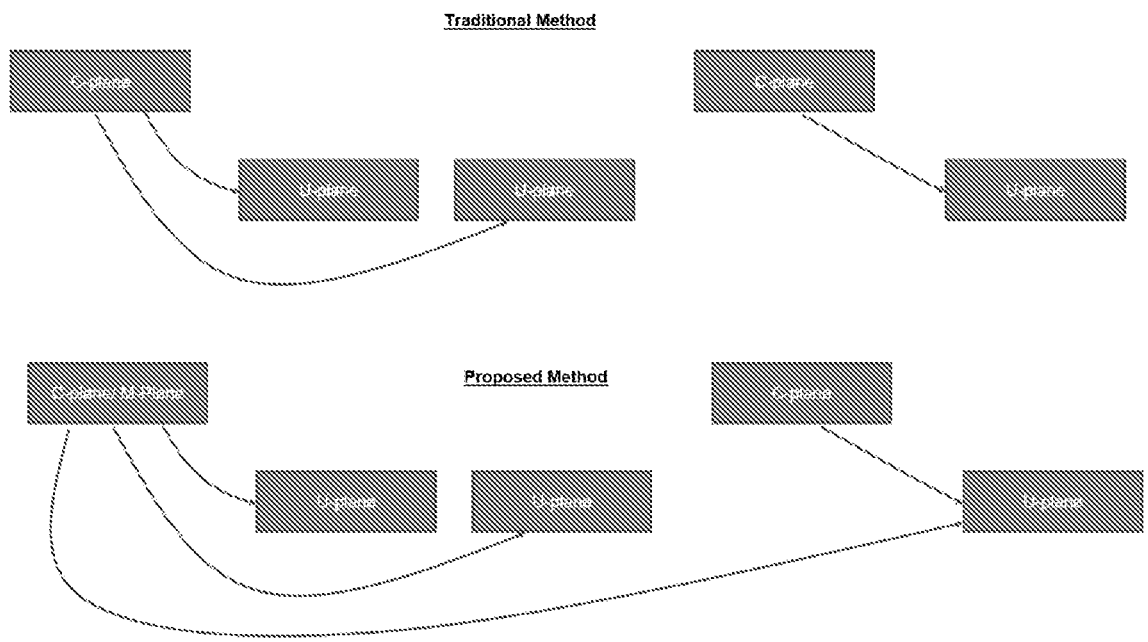
FIG. 6 shows the method of data transmission in the traditional and proposed communication methodologies between a DU and RU units.
Figure 7:
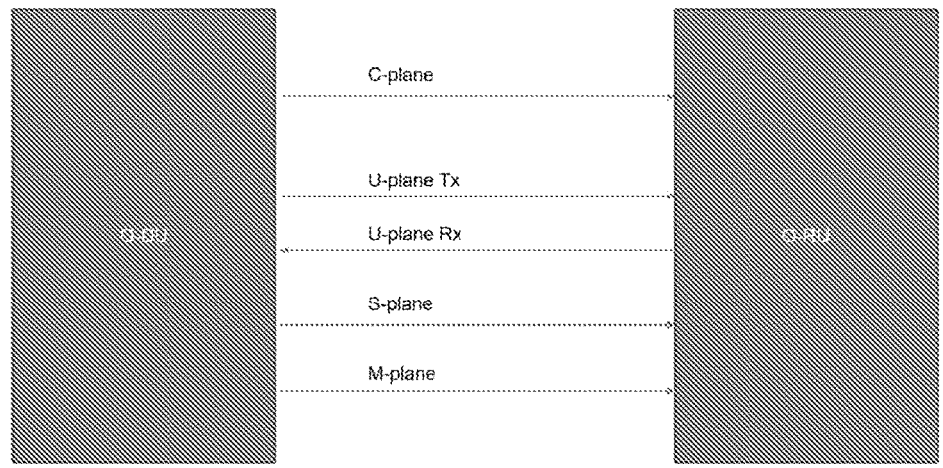
FIG. 7 shows the types of messages exchanged between a DU and RU in an ORAN compatible mode.
Figure 8:
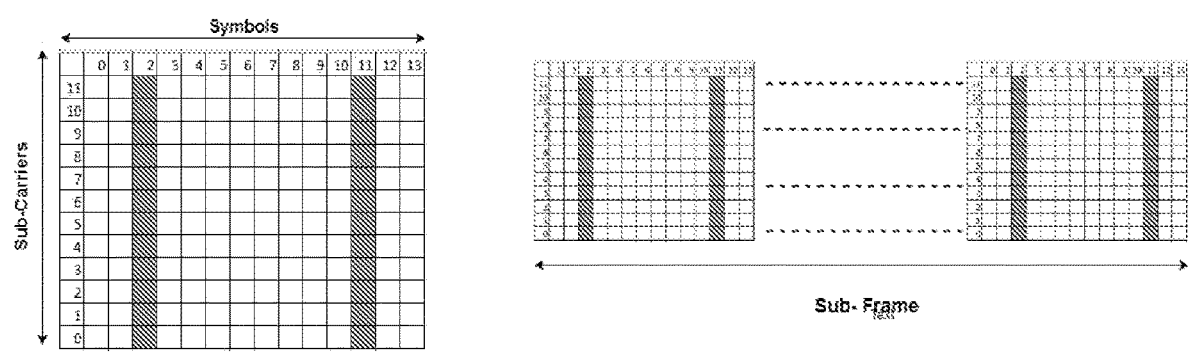
FIG. 8 shows Typical downlink sub-frame which shows the periodic and repetitive nature of the subcarriers in the resource grid, in which highlighted subcarriers occupies fixed and repetitive positions in the resource grid.
Figure 9:
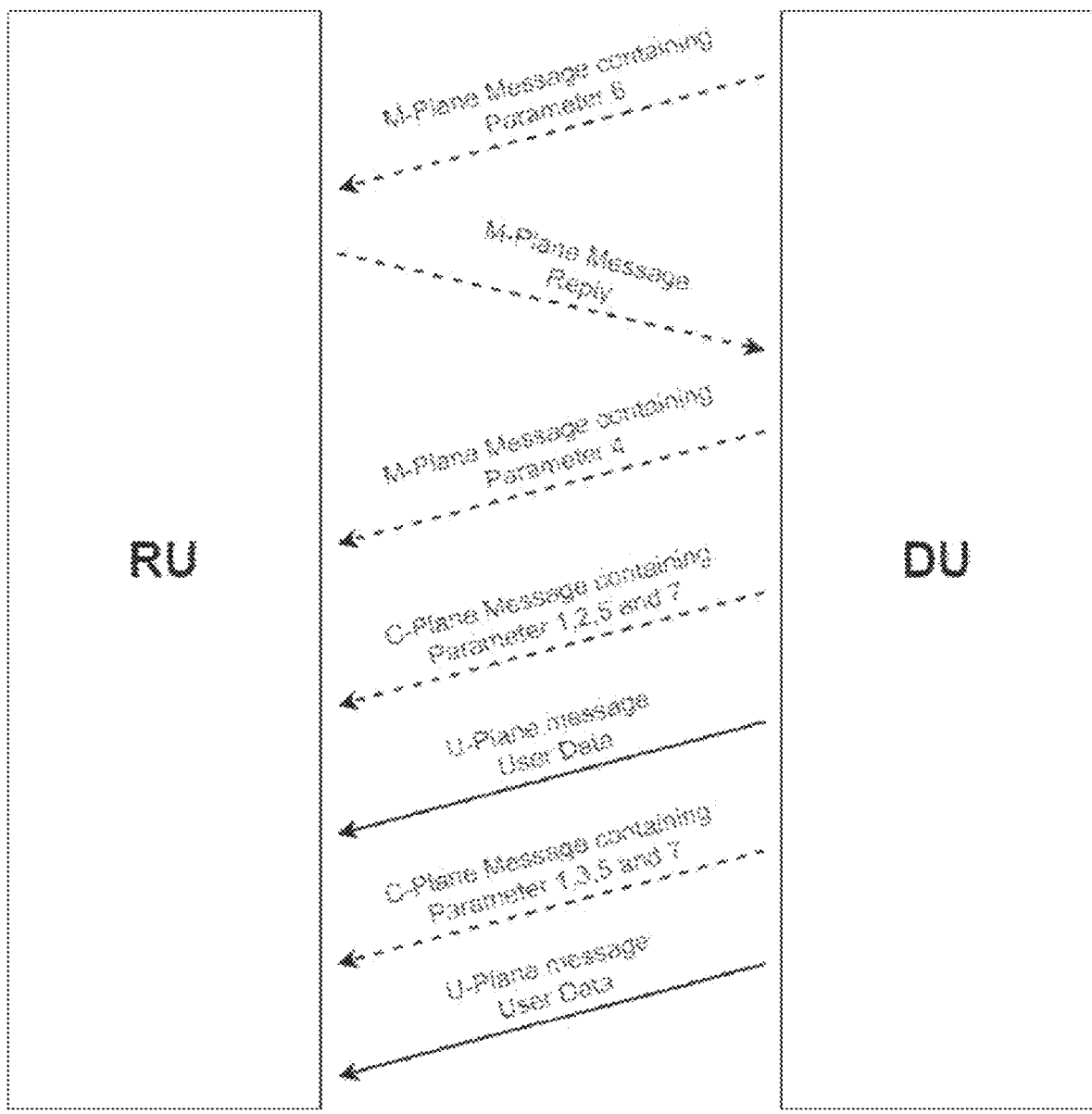
FIG. 9 shows message flow between DU and RU for supporting fewer C plane messages exchanged between DU and RU for repetitive/semi persistent.

FIG. 6 shows the method of data transmission in the traditional and proposed communication methodologies between a DU and RU units;

FIG. 7 shows the types of messages exchanged between a DU and RU in an ORAN compatible mode;

FIG. 8 shows Typical downlink sub-frame which shows the periodic and repetitive nature of the subcarriers in the resource grid, in which highlighted subcarriers occupies fixed and repetitive positions in the resource grid;

FIG. 9 shows message flow between DU and RU for supporting fewer C plane messages exchanged between DU and RU for repetitive/semi persistent.

FIG. 10 shows example C-plane message inside which the parameters for indicating the scheduling of semi persistent data is indicated. Using this information, and the C-plane ID, the section ID, section header, the corresponding U-plane data can be handled accordingly inside the RU. Similarly, other parameters can also be embedded inside the C-plane messages.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of communication in a base station (BS), the method comprising:
   transmitting control information, by a distributed unit (DU), to a radio unit (RU) using a control message;
   transmitting u-plane data, by the DU, to the RU using a u-plane message;
   receiving the u-plane message, by the RU, according to a semi persistent technique or a periodic technique,
   wherein the control message comprises a c-plane message or an m-plane message, wherein the control message comprises an indication to use the semi persistent technique or the periodic technique to receive the u-plane message, and
   the indication is valid to be used by the RU to receive: the u-plane message carrying the u-plane data; and at least one u-plane message subsequently received by the RU, for a predetermined time period as indicated by the control message.

2. The method as claimed in claim 1, wherein: the u-plane data comprises at least one of: uplink data; or downlink data, wherein the uplink data is associated with one of: a physical random access channel (PRACH), a sounding reference signal (SRS), a physical uplink shared channel (PUSCH), a physical uplink control channel (PUCCH), or a first reference signal (RS), and wherein the downlink data is associated with one of: a synchronization signal block (SSB), a physical downlink control channel (PDCCH), a physical downlink shared channel (PDSCH), or a second RS.

3. The method as claimed in claim 1, wherein the method comprises transmitting an indication, from the RU to the DU, regarding handling at least one of: the semi persistent technique or the periodic technique.

4. The method as claimed in claim 1, wherein the predetermined time period is determined according to at least one of: symbols, slots, sub-frames, or frames.

5. The method as claimed in claim 1, wherein the DU causes the RU to apply the at least one of: the semi persistent technique or the periodic technique, after a time delay or at a predefined indicated time instant.

6. A base station (BS), the BS comprising:
   a distributed unit (DU) configured to perform High-PHY processing; and
   a radio unit (RU) configured to perform low-PHY processing, wherein:
   the DU is configured to transmit control information to the RU using a control message,
   the DU is configured to transmit u-plane data to the RU using a u-plane message,
   the RU is configured to receive the u-plane message according to a semi persistent technique or a periodic technique, the control message comprising a c-plane message or an m-plane message, wherein the control message comprises an indication to use the semi persistent technique or the periodic technique to receive the u-plane message, and
   the indication is valid to be used by the RU to receive: the u-plane message carrying the u-plane data; and at least one u-plane message subsequently received by the RU, for a predetermined time period as indicated by the control message.

7. The BS as claimed in claim 6, wherein: the u-plane data comprises at least one of: uplink data or downlink data, wherein the uplink data is associated with one of: a physical random access channel (PRACH), a sounding reference signal (SRS), a physical uplink shared channel (PUSCH), a physical uplink control channel (PUCCH), or a first reference signal (RS), and wherein the downlink data is associated with one of: a synchronization signal block (SSB), a physical downlink control channel (PDCCH), a physical downlink shared channel (PDSCH), or a second RS.

8. The BS as claimed in claim 6, wherein the RU is configured to transmit an indication, to the DU, regarding handling at least one of: the semi persistent technique or the periodic technique.

9. The BS as claimed in claim 6, wherein the predetermined time period is determined according to at least one of: symbols, slots, sub-frames, or frames.

10. The BS as claimed in claim 6, wherein the DU is configured to cause the RU to apply the at least one of: the semi persistent technique or the periodic technique, after a time delay or at a predefined indicated time instant.

* * * * *